June 12, 1962   J. B. LAGSDIN   3,038,584
ADJUSTABLE FLEXIBLE GUIDES FOR CONVEYORS
Filed Dec. 12, 1960   2 Sheets-Sheet 1
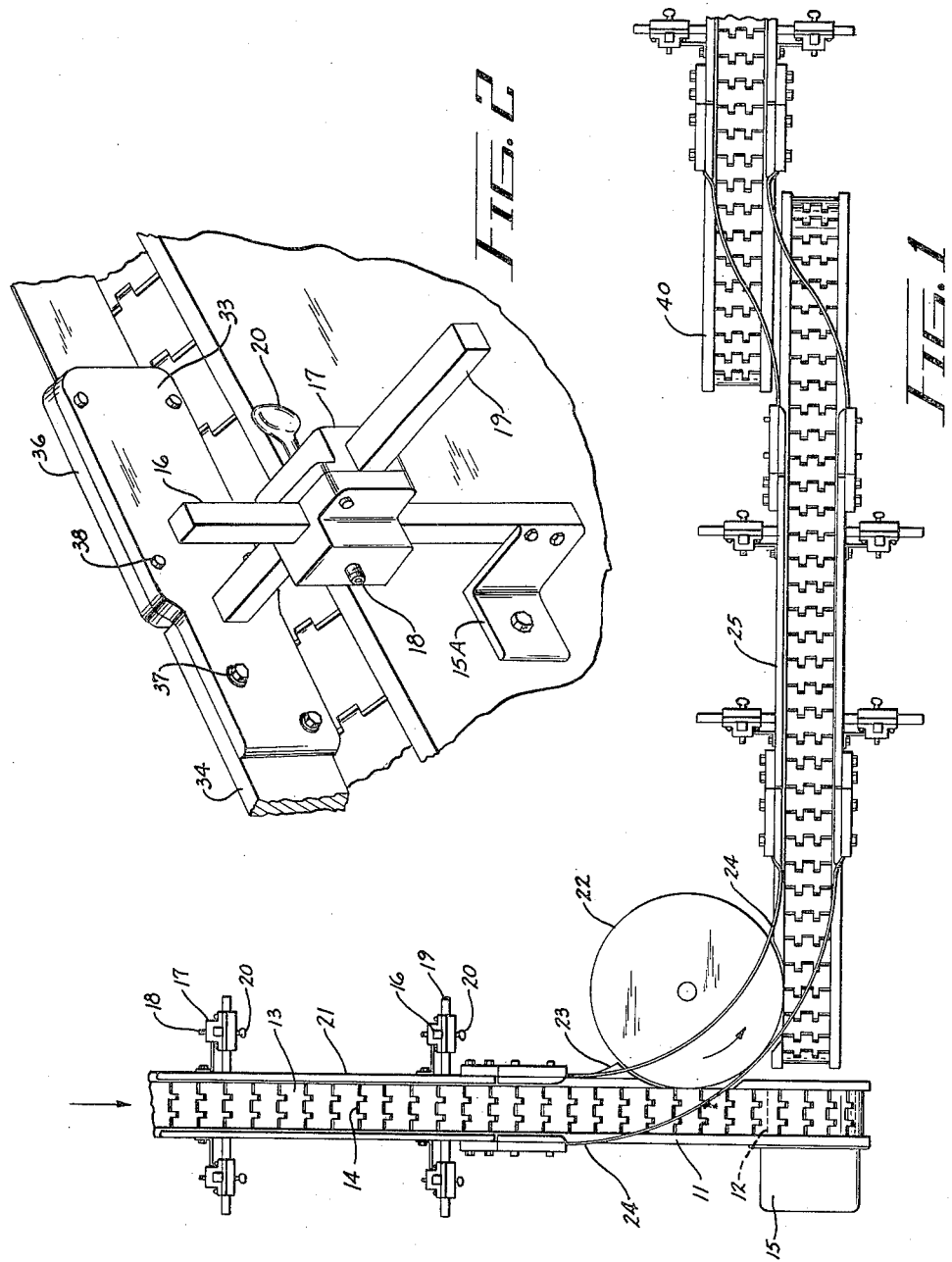
INVENTOR.
JULIUS BERNARD LAGSDIN
BY
Samuel Branch Walker
ATTORNEY June 12, 1962   J. B. LAGSDIN   3,038,584
ADJUSTABLE FLEXIBLE GUIDES FOR CONVEYORS
Filed Dec. 12, 1960   2 Sheets-Sheet 2
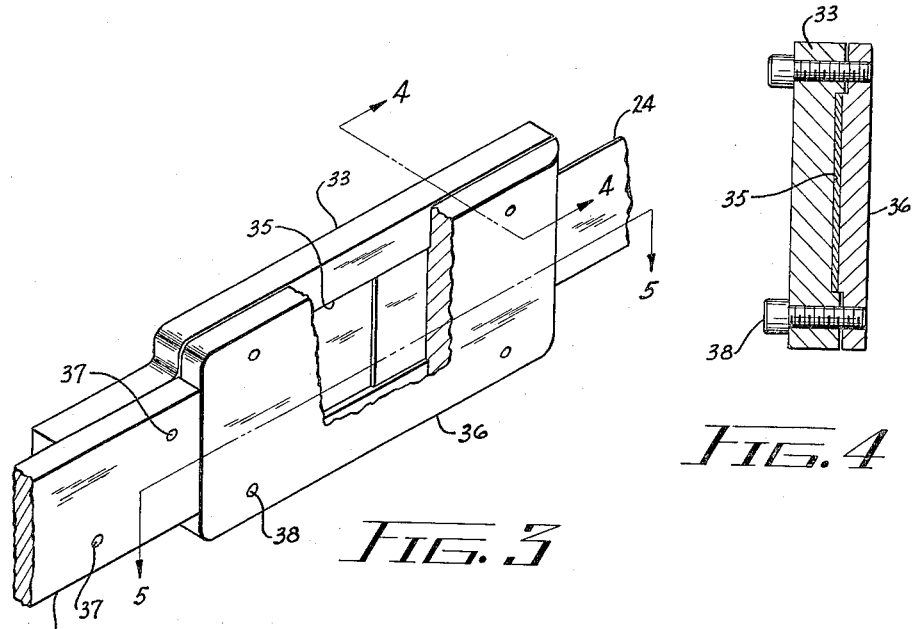
FIG. 3
FIG. 4
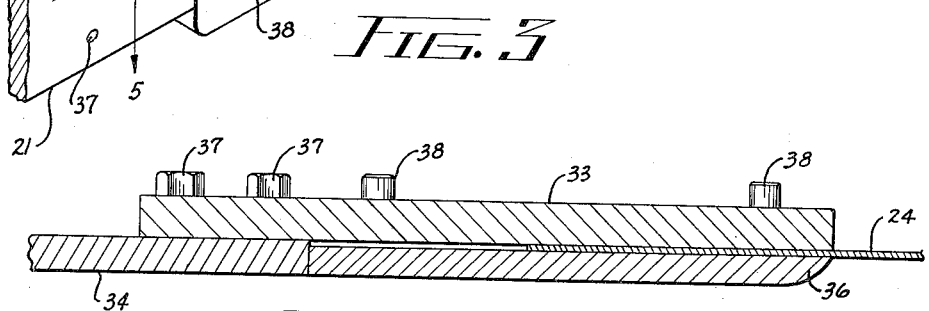
FIG. 5
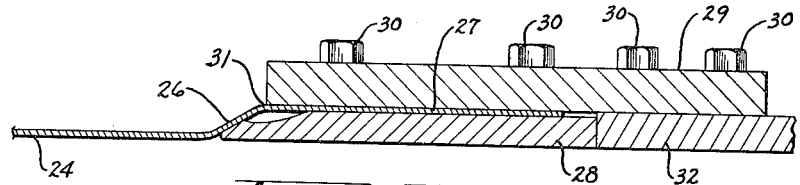
FIG. 6
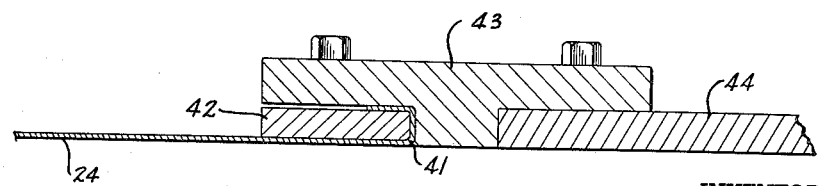
FIG. 7
INVENTOR.
JULIUS BERNARD LAGSDIN
BY
Samuel Branch Walker
ATTORNEY

United States Patent Office 3,038,584
Patented June 12, 1962

3,038,584
ADJUSTABLE FLEXIBLE GUIDES FOR CONVEYORS
Julius Bernard Lagsdin, Pearl River, N.Y., assignor to American Cyanamid Company, New York, N.Y., a corporation of Maine
Filed Dec. 12, 1960, Ser. No. 75,166
2 Claims. (Cl. 198—28)

This invention relates to flexible guides for systems; and more particularly to adjustable flexible direction-changing guides for conveyor systems, which flexible guides are set up to control the path of an article from one conveyor to another, and which flexible guides render a change from one size and shape article to another and one sequence of operations to another, particularly convenient.

For flexibility in the size of the articles being conveyed, it is usually customary to have rigid guides known as rigid guide rails on each side of, and above the conveying surface. These rigid guide rails are usually positionable so that the center of gravity of the conveyed article is at about the height of the center of the guide rails. Thus, if an article is thrown against the guide rail, the center of gravity is within the width of the guide rail, and the article tends to be stabilized against overturning or being deflected off the conveyor. With various heights of articles, it is necessary that this rigid guide rail be positionable vertically. With various diameters, it is desirable that this fixed guide rail be positionable laterally with respect to the conveyor surface. In order that the path may be controlled, the rigid guide rails should be positioned close enough together to control the path of the article, having due respect for the shape of the article, and yet be far enough apart to allow the objects to move freely between the guide rails. Hence, when rigid guide rails are used between adjacent conveyors, it is necessary that the two guide rails bear a cooperative relationship with each other, so that the path between them is of the desired width at each and every point.

It has now been found that rather than using individual fixed guides for particular curved guide paths, a single pair of flexible guides may be used for a large variety of separate guide paths, including such operations as slight deviations, switching, turns of 90° or more, an ogee curve, such as transferring from one conveyor to a parallel conveyor, or transferring from a conveyor to a particular packaging machine, and from the packaging machine discharge chute back on to the conveyor, as the exigencies of the situation may demand.

The flexible guides are positioned with respect to the guide rails, such that there is a smooth transition from each to the other in the direction of article flow, so that there are no corners, crevices, or reentrant edges, on which an article can hang up and block the conveyor, and at the same time the degree of curvature is easily adjusted.

This is accomplished by using one fixed end which is held adjacent to the receiving conveyor so that it forms a smooth transition to the fixed guide rails of the receiving conveyor, and is held in position adjacent to the feed conveyor such that the length of the adjustable guides may be changed by clamping a greater or shorter length of the flexible guide in an adjustable bracket adjacent to the rigid guide rail. By having both ends fixed both as to direction and length, the flexible guide automatically adjusts its own curvature due to its flexibility to the smoothest path between the two conveyors, and by lengthening or shortening one of the flexible guides, the distance between them is readily adjusted.

For extremely high speed conveying work, it is convenient to have the end portions of the flexible guides slightly stiffer so that rather than having a uniform degree of curvature, the curvature adjacent the ends is slightly less, thus spiralling the path of an article from the straight of the conveyor to the maximum curvature of the flexible guide, and again in a reverse spiral from the maximum curvature of the flexible guide back to the path along the next succeeding straight conveyor. The theory as to such rates of curvature using a parabolic, or spiral, transition section are described at length in a patent to Krupp et al., 2,897,947, Curved Guide Rail for Container Conveyor Transfer, August 4, 1959.

While it will be understood that the exact size and shape and degree of curvature are controlled by the operating requirements for a particular installation, the invention is illustrated for a typical installation in the accompanying drawings in which:

FIGURE 1 is a planned view of a part of a system involving three conveyors, including one 90° transfer and one ogee transfer to a parallel conveyor.

FIGURE 2 is a detail of a rigid guide rail positioning clamp.

FIGURE 3 is a pictorial view of an axially adjustable flexible guide bracket assembly.

FIGURE 4 is a section along line 4—4 of FIGURE 3, showing a section of the adjustable flexible guide bracket assembly.

FIGURE 5 is a horizontal section of the adjustable flexible guide assembly.

FIGURE 6 is a horizontal section of an offset retainer assembly for the flexible guide.

FIGURE 7 is a modification of the offset retainer for the flexible guide.

In accordance with conventional practice, in a frame 11 is supported a pair of pulleys 12, the near one of which only is shown, over which is passed the conveyor belt 13. The conveyor belt consists of a plurality of links 14, each pivoting on a pin between adjacent links. The belt is driven by a drive motor 15. On each side of the frame in a suitable bracket 15A is positioned a rigid guide rail support bar 16, as shown in FIGURES 1 and 2. Conveniently, this rigid guide rail support bar is a rectangular bar extending vertically, and supported from the frame. Mounted on this rigid guide rail support bar is a double half shell clamp 17. Conveniently, this clamp has two half shells, each with a tunnel for a support bar, which tunnels are at right angles to each other. The two halves are clamped together by suitable fastening means; for example, bolts. The double half shell clamp is adjustable vertically on the rigid guide rail support bar 16, and is positioned by a clamp set screw 18. Conveniently, this clamp set screw is a headless screw with a hexagonal socket for an Allen wrench. The vertical adjustment is not as frequently used as the horizontal, and by having an Allen set screw for vertical adjustment clamp, it cannot be mistaken for the horizontal adjustment.

Horizontally extending through the other half of the double half shell clamp is the rigid guide rail positioning bar 19; conveniently, this is a rectangular bar extending through the double half shell clamp horizontally, and is positioned in said clamp by a thumb screw 20. The thumb screw is loosened and the rigid guide rail positioning bar is slid in and out through the tunnel for lateral adjusting of the rigid guide rail 21, which is positioned on the end of the rigid guide rail positioning bar. Each end of each rigid guide rail is positioned by a similar support. Where long rigid guide rails are used, central supports may also be used. The rigid guide rail positioning bar may be integral with the flexible guide adjustable bracket 33, as shown in FIGURE 2, or separate as shown in FIGURE 1.

In operation, a group of such conveyors are used. For simple installations, two such conveyors may be adequate.

For more complex installations in which a large number of operations are conducted, as many as a dozen or more conveyors are positioned between the various operating stations in which the various filling operations are conducted, to move articles from one to the other.

As shown in FIGURE 1, two such conveyors are positioned at 90° to each other. At the interior of the angle is a transfer table 22, which is a disk suitably mounted on a drive motor, and positioned so that it is nearly tangent to the sides of the conveyors, and driven at such a speed that as articles are guided from one conveyor onto the transfer table, their speed is approximately the same as on the conveyor, and are transferred along a path by the transfer table to the succeeding conveyor. The details of this transfer table are conventional. Filling in between the transfer table and the conveyors is a dead plate 23. The plate is called a dead plate because it is non-moving, and articles resting thereon are not driven. The dead plate is of such size as to fill in the gap between the transfer table, and the conveyor, so that articles cannot fall between the transfer table and the surface of the conveyor belts. Several dead plates of different sizes and shapes may be used as required to fill in the gaps. It is convenient to have the dead plate 23, and the transfer table 22, mounted on the frame of the conveyor so that the dead plate and transfer table are, in effect, an integral part of the conveyor itself to aid in transferring to the succeeding conveying section. Between the two conveyor sections is the flexible guide section.

The flexible guides 24 are conveniently of spring steel or stainless steel, and are of a width approximately the same as the rigid guide rails. Whereas the size and shape may vary depending upon the size and shape of the conveyors and the articles to be transferred, for many pharmaceutical operations a stainless steel strip one inch and one-half wide, and 1/32-inch thick, gives good results.

As shown in FIGURE 6, the end of a flexible guide adjacent to the receiving conveyor 25 has an offset 26 therein. The offset end has an ogee curve such that the end is displaced laterally with a smooth S-curve so that the part beyond the offset is parallel to the main body of the flexible guide. The offset end 27 is clamped between an offset retainer 28, and an offset bracket 29. The offset retainer and offset bracket are conveniently held together by bolts 30. As this adjustment is not frequently disturbed, a hex-head bolt is a good retaining means. Conveniently, the offset bracket 29 is of a configuration in cross section similar to that shown in FIGURE 4 for the other end of the flexible guide, and has a groove in the offset bracket to receive the end of the flexible guide. The offset retainer groove 31 should be just wide enough to receive the width of the flexible guide so that the flexible guide is directionally firmly positioned therein. The offset bracket 29 is bolted to the upper end of the rigid guide rail 32 of the receiving conveyor. The offset is of a lateral distance such that the offset retainer 28 acts as a fillet to fill in between the upper end of the rigid guide rail 32 and the offset 26. Thus, on the inner side of the assembly, which faces the articles to be conveyed, a smooth surface is presented which is essentially free from grooves, cracks, crevices, or re-entrant angles on which the article being conveyed could catch, bind, or jam.

At the other end, or upper end, of the flexible guide 24 is an adjustable bracket 33. The adjustable bracket is attached to the lower end of the rigid guide rail 34 of the feeding conveyor. An adjustable bracket groove 35 receives the straight end of the flexible guide. The flexible guide is positioned in the groove and held by the adjustable plate 36. The adjustable plate fills the groove, and is of such thickness as to be contiguous with the lower end of the rigid guide rail. Conveniently, the adjustable bracket is held to the rigid guide rail by bolts 37, which have a hex-head. The adjustable plate is held against the adjustable bracket by cap screws 38, which are conveniently Allen-headed. The adjustable bracket forms an extension of the rigid guide rail and is long enough so that the adjustable bracket groove 35 receiving the straight end 39 of the flexible guide can position and hold from a short section, say one inch or less, of the flexible guide up to several inches of the flexible guide. Thus, the length of the flexible guide is not critical, and a single flexible guide can be positioned so that a longer or a shorter section is clamped, thus providing for flexibility in spacing, as well as changes in curvature.

In use, the inner guide and the outer guide are effectively the same with the smooth surfaces of each facing the articles to be conveyed. There is a slight offset from the adjustable plate 36, to the straight end of the flexible guide, but this is smoothly curved and, as the articles are passing from the narrower to the wider section, no difficulties are caused.

In setting up the conveyors, the conveyors are set in the position which is desired, with the upper end of the second conveyor adjacent to the turntable at the lower end of the first conveyor. Dead plates are introduced as necessary. After the path of the conveyors is set up, the rigid guide rails are set at a height such that the center of gravity of the article to be conveyed is approximately opposite the center of the rigid guide rail. This permits access to the article above and below the rigid guide rail, and yet positions the article such that if it strikes against the guide rail there is no tendency for the article to fall either towards or away from the rails, at either end.

After the rigid guide rails are set for height, the thumb screws 20 are loosened and the rigid guide rails on each side are set laterally so that the path between them is slightly greater than the thickness of the article being conveyed.

At this point, the flexible guides are adjusted. Usually, a flexible guide is left attached to each side of the upper end of the second conveyor, or of any conveyor which may be used to receive the articles. Thus, the hex-head bolts need not be disturbed, but remain in place during change of set-ups. The straight end 39 of each flexible guide is then threaded between the adjustable bracket 33 and the adjustable plate 36, and the length of free flexible guide is adjusted. The adjustment of length to the flexible guide changes the sharpness of the curvature, and as each end is positioned by the rigid guide rail, the path is easily controlled. The cooperating flexible guide on the other side of the article path is similarly adjusted, and by using a greater or shorter length of the flexible guide, the distance between them is adjusted so that the article path is substantially of uniform width. The adjustable plate is then clamped to the adjustable bracket, firmly retaining the straight end of the flexible guide therebetween.

In operation, the use of Allen-headed screws for the vertical positioning of the fixed guide rails and the length of the flexible guide rails, permits the use of only an Allen wrench in the set-up as all of the hex-headed bolts are more permanent. The use of a thumb screw for positioning the distance between the rigid guide rails prevents error on the part of the set-up man, who might otherwise loosen the wrong screw, and make a vertical, rather than a horizontal, adjustment of the end of the fixed rail.

FIGURE 1 shows an offset transfer at the lower end of the receiving conveyor 25, where the articles are offset to a third conveyor 40. In this set-up, the third conveyor 40 is placed adjacent to the end of the receiving conveyor 25, and using the same type of flexible guides, the flexible guides are adjusted to an ogee configuration. The guides naturally spring to this configuration because the ends are fixed controlling the axial direction of the ends, and a spring bent to an offset position, naturally assumes the desired double curve. By adjusting the length of the flexible guides, the width of the path between them is fixed to approximately the same width as between the rigid guide rails. In this fashion, the articles to be conveyed are smoothly transferred from the receiving conveyor 25 to the third conveyor 40.

As will be apparent, the angles between successive conveyor sections may be any angle which is convenient for a particular conveyor system set-up. The set-up mechanic is thus enabled to use a single pair of flexible guides to transfer articles from a first conveyor to any desired second conveyor. Where desired, switching operations can be accomplished by having a pair of flexible guides at the upper end of each of the alternate receiving conveyors, with the guides desired being selected for a particular operation. The switching may be accomplished by a set-up mechanic in the matter of a few minutes. The readiness with which switching can be accomplished thus permits flexibility in operations, if there are two or more receiving lines which may be alternately called upon to receive a series of conveyed articles. Of course, automatic switches can be provided using the type of construction common in railroads, where it is considered necessary or desirable to be able to switch succeeding articles at production speed as they come down the conveyors, so that each individual article may be shunted into an appropriate succeeding path depending upon size, classification, inspection characteristics, etc.

In FIGURE 7 is shown an alternative construction for the offset end of the flexible guides in which the offset end is bent around in an offset hook 41, around a retaining plate 42, which is held in a T bracket 43, which accomplishes transition from the flexible guide to a rigid guide rail 44.

As will be apparent to those skilled in the art, the exact proportions of the present flexible guide system may be conveniently modified to fit particular requirements. Similarly, the degree of flexibility of the flexible guides may be varied depending upon the weight or mass of the article being conveyed, and the sharpness of curves which are desired in the conveyed article's path. The flexible guide should have sufficient flexibility that it is not appreciably bent by the articles in their normal movement along their path from conveyor to conveyor, but should have sufficient flexibility that should a jam-up occur, the flexibility of the conveyors permits the articles to be deflected somewhat from their path without breakage.

A preferred embodiment is shown in the drawings and described in detail in the specification; the scope of the invention being defined in the following claims.

I claim:

1. In a conveyor system having at least two endless conveyors, at least one of which is independently movable, each conveyor having rigid guide rails on each side of and above the conveying surface, means for adjusting said rigid guide rails as to height above the conveying surface and lateral spacing with respect to the conveying surface, to readily accommodate a variety of sizes of conveyed articles; the combination therewith of a pair of flexible guides between two conveyors for smoothly guiding conveyed articles in a gradual transition path from one conveyor to the other, each flexible guide having an offset end at the discharge end; a pair of offset brackets having a groove therein, attached to the forward ends of the rigid guide rails of the receiving conveyor, and positioned thereby, and a cooperating offset retainer, means to clamp the offset end of the flexible guide between said offset retainer and said offset bracket and in said groove, the proportions being such that the article facing side of said flexible guide, offset retainer and rigid guide rail form a substantially smooth surface and at the feed end of each flexible guide, an adjustable bracket, attached to the adjacent rigid guide, and positioned thereby, and having a groove therein, a cooperating adjustable plate, means to clamp the feed end of the adjustable guide between the adjustable bracket and the adjustable plate, the proportions of the groove being such that the flexible guide is adjustable axially with the adjustable plate forming a gradual transition from the adjacent rigid guide rail to the flexible guide; said guides forming a smooth, interchangeable, readily adjustable article directing path between two conveyor sections.

2. In a conveyor system having at least two endless conveyors, at least one of which is independently movable, each conveyor having rigid guide rails on each side of and above the conveying surface, to readily accommodate a variety of sizes of conveyed articles; the combination therewith of a pair of flexible guides between two conveyors for smoothly guiding conveyed articles in a gradual transition path from one conveyor to the other, each flexible guide having an offset end at the discharge end; a pair of offset brackets having a groove therein, attached to the forward ends of the rigid guide rails of the receiving conveyor, and positioned thereby, and a cooperating offset retainer, means to clamp the offset end of the flexible guide between said offset retainer and said offset bracket, and in said groove, the proportions being such that the article facing side of said flexible guide, offset retainer and rigid guide rail form a substantially smooth surface and at the feed end of each flexible guide, an adjustable bracket, attached to the adjacent rigid guide, and positioned thereby, and having a groove therein, a cooperating adjustable plate, means to clamp the feed end of the adjustable guide between the adjustable bracket and the adjustable plate, the proportions of the groove being such that the flexible guide is adjustable axially, but otherwise fixed in direction, with the adjustable plate forming a gradual transition from the adjacent rigid guide rail to the flexible guide; said guides forming a smooth, interchangeable, readily adjustable article directing path between two conveyor sections.

References Cited in the file of this patent

UNITED STATES PATENTS

| | | |
|---|---|---|
| 2,425,158 | Masich | Aug. 5, 1947 |
| 2,585,674 | Owen | Feb. 12, 1952 |
| 2,702,624 | Rhodes | Feb. 22, 1955 |
| 2,897,947 | Krupp et al. | Aug. 4, 1959 |